United States Patent [19]

Murray

[11] Patent Number: 4,543,984
[45] Date of Patent: Oct. 1, 1985

[54] TRUCK TRAILER BRAKE AIRLINE LOCK

[76] Inventor: John M. Murray, 8633 Delmonico Ave., Canoga Park, Calif. 91304

[21] Appl. No.: 530,530

[22] Filed: Sep. 9, 1983

[51] Int. Cl.[4] .................. F16K 35/00; B60T 11/00
[52] U.S. Cl. .................... 137/385; 137/637.1;
  137/865; 137/899; 251/248; 188/353; 280/428;
  303/89
[58] Field of Search .................. 137/383, 384.2, 384.6,
  137/385, 637.1, 865, 899; 188/265, 353; 303/89;
  251/248; 280/428, 427

[56] References Cited

U.S. PATENT DOCUMENTS

| | | | |
|---|---|---|---|
| 600,944 | 3/1898 | Burdett | 251/248 |
| 667553 | 2/1901 | Mumford | 137/865 |
| 1,265,450 | 5/1918 | Hicks | 137/385 |
| 1,739,496 | 12/1929 | Bartholomew | 280/427 |
| 1,766,780 | 6/1930 | Finch | 280/428 |
| 2,006,027 | 6/1935 | Moore | 137/384.2 |
| 2,136,410 | 11/1938 | Boldt et al. | 188/353 |

FOREIGN PATENT DOCUMENTS 1580183 11/1980 United Kingdom ............ 137/384.2

*Primary Examiner*—A. Michael Chambers
*Attorney, Agent, or Firm*—Allan M. Shapiro

[57] ABSTRACT

Highway trailer for hauling cargo has air actuated brakes. Valve mounted on the trailer connected in the air line maintains brake-on air pressure in the line while trailer is parked. Valve has locking handle to inhibit trailer theft.

8 Claims, 5 Drawing Figures

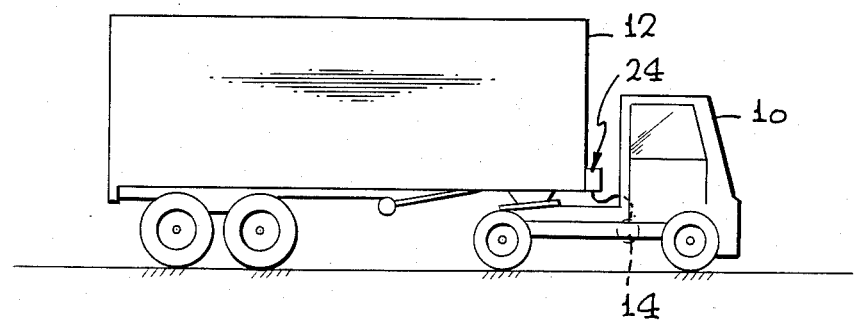
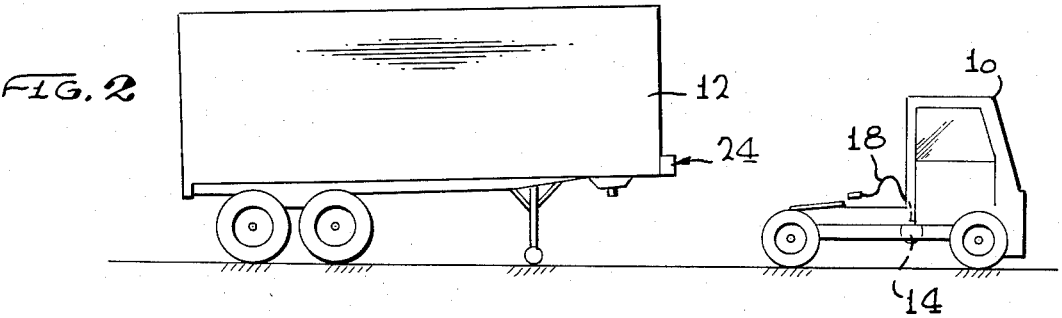
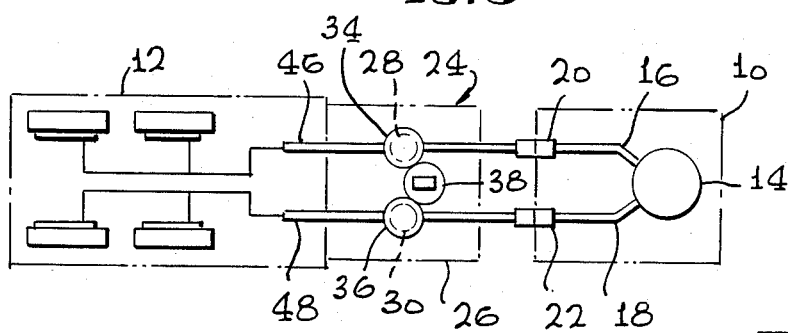
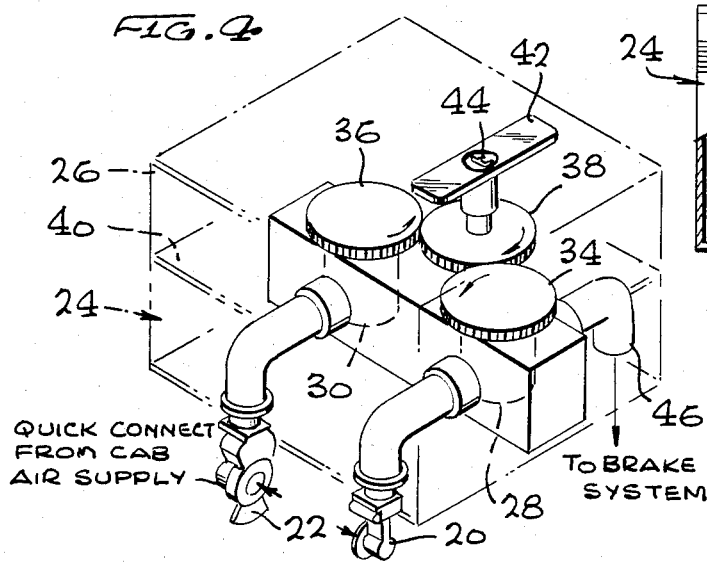
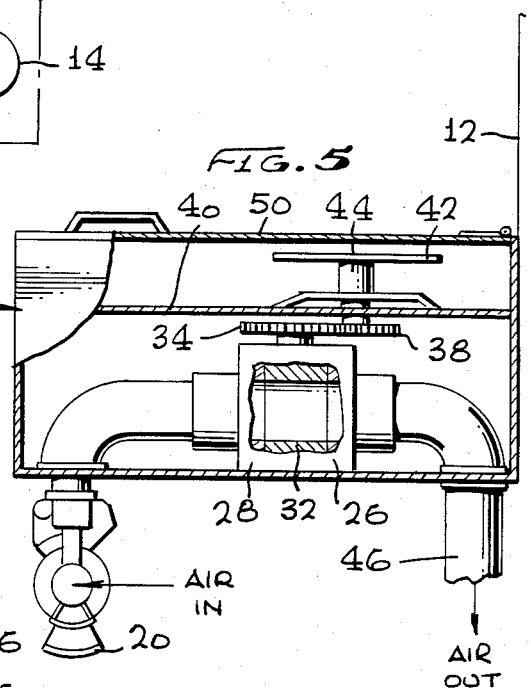

TRUCK TRAILER BRAKE AIRLINE LOCK

BACKGROUND OF THE INVENTION

This invention is directed to a truck trailer brake airline lock where a valve in the air line in the trailer has a lock thereon so that when the brakes are applied, the air line is maintained at the brake-on pressure. In most cases, this is an elevated pressure because in most systems pressure in the air line causes brake actuation.

Trailers and semi-trailers are used for the transport over the highways of much merchandise of modern commerce. The trucks which pull these trailers and semi-trailers are usually provided with an air brake system where air under pressure is supplied to an air line. The air line has a diaphragm which, when actuated, applies the brakes. Usually the mechanism is such that when air pressure rises in the line, the brakes are actuated. Furthermore, in modern systems the air line parts of the brake system are duplicated so that should there be a failure, some braking can still be achieved.

When a trailer or semi-trailer loaded with cargo is parked, it is susceptible to theft by the simple attachment of a new truck, which supplies the braking needs. In order to inhibit theft of the trailer and its cargo, a brake air line locking valve is required.

While locking valves are known, an organization suitable for use on a trailer to lock the trailer brakes in the absence of the truck has not been taught. Maxwell, U.S. Pat. No. 3,998,495 teaches a structure where a separate parking brake system in a truck can be locked from the driver's position. The teaching of that patent is for a separate air brake system, but not for trailer usage. Similar, Cvetkovich, U.S. Pat. No. 3,682,195 locks a hydraulic braking system with a key at the driver's position. Neither of those patents has a significant teaching for trailers. Polit, U.S. Pat. No. 3,362,426 is concerned with anti-theft features and provides a lockable turnoff valve in the conventional hydraulic brake system of an automobile. As an alternative, this valve could be employed in the fuel system. Also in the background is Burdett, U.S. Pat. No. 600,944 which teaches the operating together of a pair of steam valves. None of this art teaches the need for locking the brake system on a trailer or the combination of structure by which it can be accomplished.

SUMMARY OF THE INVENTION

In order to aid in the understanding of this invention, it can be stated in essentially summary form that it is directed to a truck trailer brake air line lock wherein a valve in the air line has an actuating handle thereon and the actuating handle can be disconnected by lock actuation. In this way, the air line is turned off so that it cannot be actuated from the truck unless the lock is deactuated to permit the handle to turn the valve on thereby permitting brake air to flow from the truck to the trailer to control the trailer brakes.

It is an object and advantage of this invention to provide a locking valve in the brake air line of a trailer so that when the trailer is parked and the valve is closed, the brakes are held in the engaged position so that the trailer cannot be moved without use of the proper key.

It is a further object and purpose of this invention to provide a system whereby the theft of a trailer equipped with an air brake system is inhibited by providing a valve in the air brake system on the trailer and a lock to lock the valve in the brakes-engaged position so that the trailer cannot be moved until the locked valve is actuated.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side elevational view of a truck in combination with a semi-trailer, and incorporating the brake air line lock of this invention.

FIG. 2 shows the same combination, but with the truck separated from the semi-trailer and showing the semi-trailer in the brake-locked condition.

FIG. 3 is a schematic top view of the system of FIGS. 1 and 2.

FIG. 4 is an isometric view of the brake air line lock structure.

FIG. 5 is a left-side elevational view of the brake air line lock structure with the near portion of the housing broken away, and other parts broken away and taken in section.

DESCRIPTION OF THE PREFERRED EMBODIMENT

FIGS. 1, 2 and 3 show a truck 10 in association with a semi-trailer 12. These units are shown as an example for which the truck trailer brake air line lock of this invention is suitable. Other combinations of towing devices and trailers or semi-trailers as well as trucks can be protected by the truck trailer brake air line lock system of this invention. Truck 10 has a brake air compressor system 14 mounted thereon which may be driven by the engine or may be driven by other motive means. The system 14 carries the compressor, a suitable compressed air storage tank and a valve controlled by the driver by which the air is delivered for braking. Separate control valves are often provided for the truck and the towed trailer or semi-trailer. In modern practice, the brake control valve delivers air through a pair of air lines 16 and 18 which terminate in quick disconnect fittings 20 and 22 which have portions on the terminal end of the truck air line hoses and portions on semi-trailer 12.

The truck trailer brake air line lock of this invention is generally indicated at 24 in each of FIGS. 1 through 5. Housing 26 is permanently attached to the front of semi-trailer 12 and carries therein the valve and lock portion of the brake air line lock system. In modern trailer and semi-trailer brake systems, dual air lines are provided for redundancy. For this reason, left and right valves 28 and 30 are mounted within housing 26. FIG. 5 shows left valve 28 with parts broken away to show the interior valve plug 32. The valve plug has an interior opening therethrough so that when it is aligned with the air line, the valve is open as shown in FIG. 5. When plug 32 is rotated a quarter turn, the opening through the plug is out of alignment with the opening through the valve body and, therefore, the valve is turned off. Gear 34 is secured to the top of the valve plug to rotate it between the open and closed positions. Gear 36, see FIG. 4, is secured to the top of the plug in valve 30 to have the same function. Drive gear 38 is engaged with gears 34 and 36. The plugs in valves 28 and 30 are oriented in the same position and all three gears have the same number of teeth so that when drive gear 38 is rotated one-quarter turn, both valves are moved between the open and closed positions.

Both of the valves are secured to the bottom of housing 26, and the housing has a dividing wall 40 extending thereacross above the gears. Gear 38 has an upstanding stud extending up through dividing wall 40. Manual handle 42 is mounted upon the stud and is provided with a lock 44. Lock 44 is preferably a key lock, but may be a combination lock if desired. When lock 44 is in the locked condition, handle 42 is free on the stud so that rotation of the handle will not turn gear 32 and the related valves. When lock 44 is unlocked, then handle 42 is rotatably attached to the stud so that rotation of the handle rotates the valve plugs.

As is seen in FIGS. 4 and 5, the trailer portions of the quick disconnect fittings 20 and 22 are connected directly to valves 28 and 30, respectively. The outlet sides of these valves are respectively connected to trailer air lines 46 and 48. The trailer air lines are connected to the brake systems of the wheels. In modern practice, one of the air lines operates the brakes on half of the wheels and the other air line operates the brakes on the other half of the wheels. In this way, if there is a failure, some of the braking is maintained. It is because of this redundancy that there are two valves and the two valves are operated together.

In normal operation, truck 10 is connected to semi-trailer 12, as shown in FIG. 1. The air lines are connected through the quick disconnects 20 and 22 across the truck-trailer interface. The lock 44 is unlocked and the valves are turned into the open position. It may be desirable to lock them in the open position by operating lock 44 so that rotation of handle 22 does not rotate the valves. The system is in the normal truck operating condition. Hinge cover 50 on the top of housing 26 merely keeps the weather and road dust out of the housing. In this condition, the truck takes the trailer to a point where it may be unhitched, as shown in FIG. 2. In the usual truck systems, air in the lines causes brake actuation. In order to maintain the trailer brakes in the actuated position, the trailer brakes are maintained on and handle 42 is employed to manually turn the valves 28 and 30 to the off condition. Thereupon, lock 44 is key-actuated to disconnect handle 42 so that the valves may no longer be manually turned. At this point, the air is released from the forward part of the lines by moving the brake control in the truck to the no-braking position and, thereupon, the quick disconnects 20 and 22 are released. Now, the truck 10 can be unhitched from the trailer and driven away. The trailer 20 stays in place with air in its brake lines to inhibit theft of the trailer. It cannot be hauled away until its brakes are released, and this is inhibited by the locked valves. If the air was lost in the truck braking systems, through leakage or puncture, the trailer still could not be stolen because the thief's truck could not supply the air to the truck braking system because of the closed and locked valves. In this way unauthorized towing away of the truck trailer is inhibited.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A truck trailer brake air line lock comprising:

a housing enclosing a space, said housing being for mounting on a truck trailer, said housing having a wall therein;

first and second air line valves, each of said first and second air line valves having an inlet and having an outlet, said first and second air line valves being positioned within said enclosed housing;

first and second brake air line disconnect fittings rigidly connected to said housing and respectively connected to said inlets of said first and second valves, first and second trailer air lines respectively connected to said outlets of said first and second valves and extending out of said housing;

connection means between said first and second valves for operating said first and second valves together, an operating handle connected to said valve operating means and locking means connected to said valve operating handle, said locking means and said handle being positioned on the side of said dividing wall away from said valve to permit manual access to said locking means and said manual operating handle, said locking means being for disconnecting said manual operating handle from said valve operating means when said locking means is in the locked position and for connecting said manual handle with said valve operating means when said locking means is in the unlocked position so that said air lines can be selectively locked in the valve closed position to inhibit trailer brake actuation.

2. The brake air line lock of claim 1 wherein said brake air line lock is mounted on a truck trailer and is connected into the brake air line system thereof.

3. The brake air line lock of claim 2 wherein said valve operating means comprises first and second gears respectively connected to said first and second valves and a drive gear engaged with both of said first and second gears, said drive gear being connectable to be rotated by said manual operating handle by actuation of said lock means.

4. The brake air line lock of claim 2 wherein each of said first and second valves is a plug valve having a rotatable plug therein so that a quarter turn rotation of said plug causes opening and closing of said valve.

5. The brake air line lock of claim 4 wherein said valve operating means comprises first and second gears respectively connected to said first and second valves and a drive gear engaged with both of said first and second gears, said drive gear being connectable to be rotated by said manual operating handle by actuation of said lock means.

6. The brake air line lock of claim 5 wherein said brake air line lock is mounted on a truck trailer and is connected into the brake air line system thereof.

7. The brake air line lock of claim 4 wherein first and second gears are respectively mounted on said first and second valves to rotate said plugs therein and a drive gear is engaged with both of said first and second gears, said first and second gears and said drive gear each having the same number of teeth so that a one-quarter turn of said drive gear causes actuation of both said first and second valves, said drive gear having a stud thereon extending through said dividing wall, said manual handle being mounted on said stud and being connectable therewith by said locking means.

8. The brake air line lock of claim 7 wherein said brake air line lock is mounted on a truck trailer and is connected into the brake air line system thereof.

* * * * *